3,017,275
METHOD FOR IMPROVING BUTTER SPREADABILITY

Samuel T. Coulter, Marine on St. Croix, Minn., assignor to Regents of The University of Minnesota, Minneapolis, Minn., a corporation of Minnesota
No Drawing. Filed May 19, 1958, Ser. No. 735,984
11 Claims. (Cl. 99—121)

This invention relates to a method for improving the spreadability of butter. More particularly, this invention relates to a method of treating butter by chilling during the course of its manufacture to improve the spreadability of the resulting butter product.

A common complaint among users of butter is that it is difficult to spread for a considerable time period after it is removed from under refrigeration. However, refrigeration is required to preserve butter so butter is customarily left under refrigeration until just prior to use. Although, when left standing under normal room temperature conditions for a period of time, the butter softens and becomes readily spreadable, at the same time, it tends to lose some of its form and desirable flavor characteristics.

It is well known that rapid cooling of either the butter granules following churning, or of the butter following working, or both will improve the spreadability of butter by altering the crystallization of the butterfat. However, since butter conducts heat very slowly, rapid chilling is possible only in thin layers. Butter is so viscous that cooling by contact with a refrigerated metal surface is not practicable. While cooling with refrigerated air would theoretically be feasible, such a method would not be economically practicable since it could be accomplished only with thin sheets of butter.

It has now been discovered that the spreadability of butter may be improved by chilling the butter with refrigerated brine. It is the principal object of this invention to provide a simple practicable method of improving the spreadability of butter by chilling it during the manufacturing process with refrigerated brine.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

Broadly stated, this invention comprises chilling butter either immediately after churning when in granule form, or later, after the butter has been worked, or, in some instances, at both times with a refrigerated sodium chloride brine. The cream is pasteurized and cooled in the usual manner and churned under usual conditions to secure butter granules of about pea size. The buttermilk is drained from the churn. If desired, the butter granules at this stage may be washed with water, although washing is not a material factor in the result.

According to one form of the process of this invention, the butter granules at this stage, are chilled by application of refrigerated sodium chloride brine. The butter granules are agitated in contact with the refrigerated brine to rapidly lower the temperature of the butter by from about 10° to 40° F. The brine is then withdrawn, salt is added, and the butter is worked until it is essentially dry.

According to a modified and preferred form of the process of this invention, after the buttermilk is drained from the churn the butter granules are salted and the butter is worked until it is essentially dry as evidenced by examination of the cut surface made with a knife, spatula or similar tool and insuring that the working has been sufficient to fairly well incorporate the salt into the butter mass. Thereafter, refrigerated sodium chloride brine is introduced into the churn and the butter is worked in the brine by revolving the churn for a period of time to reduce the butter temperature by the desired amount. The brine is then drained from the churn and the butter is worked until judged to be fairly dry. The usual moisture and salt determinations are made and the required amount of salt and moisture are added to bring the butter to the desired composition and thereafter the butter is worked to dryness in the customary fashion.

The butter resulting from either of these procedures is found to have a very smooth waxy texture. It is softer in consistency and much more spreadable over a wider range of temperatures than butter made by conventional processes. If desired, the butter may be chilled both when in granular form and following working, although, in most instances, it will be found that a single chilling treatment in contact with the refrigerated brine will be sufficient to provide the desired improved texture.

The temperature, concentration and volume of the brine, as well as its time of contact with the butter, may be varied over fairly wide limits to produce the desired results. However, taking into account practical considerations in order to produce the desired chilling in a reasonable time, it is preferred to use brine containing from about 15% to 23% salt previously chilled to a temperature between about plus 15° F. and minus 6° F. The brine is preferably introduced into the churn in amounts ranging from about one-half to two times the weight of the buttermilk produced (i.e., from about one to four times the weight of the butter) in order to rapidly dissipate heat and chill the butter. Under these conditions, the butter is properly chilled in from about 5 to 20 minutes. Under some circumstances, it is desirable to recirculate and re-refrigerate the brine.

Butter churned under customary conditions will be at a temperature between about 55° and 60° F. It is desired to cool the butter rapidly to the range between about 25° and 45° F. The chilling may be accomplished by working the butter in the brine by rotating the churn continuously over a period of several minutes or intermittently. Preferably, the brine is left in contact wtih the butter or butter granules for at least 10 minutes. Since the butter takes up some salt from the brine, the amount of salt added directly to the butter should be reduced correspondingly.

The invention is further illustrated by the following examples:

Example I 1000 pounds of 40% butterfat cream was pasteurized at 165° F. for 30 minutes, cooled to 50° F. and held overnight. This cream was then churned under usual conditions to secure butter granules about the size of a large pea. The buttermilk was drained from the churn and the butter granules were washed with water. 1200 pounds of brine containing 22% sodium chloride, which had previously been chilled to 0° F., was then introduced into the churn. The temperature of the butter before introduction of the brine was about 56° F. The butter was agitated in contact with the chilled brine by rotating the churn for a period of about 15 minutes at which time the temperature of the butter had been reduced to about 30° F. The brine was drained from the churn. It was determined that about 0.6% of salt had been taken up by the butter from the chilled brine. Based upon the estimated amount of finished butter (492 pounds) an amount of salt equal to 7 pounds was added to incorporate about 1.4% additional salt in the finished butter to bring the total salt content up to 2% in accordance with the desires of the trade in this area. The butter was then worked to incorporate the salt into the mass and until it was essentially dry. The resulting butter product was found to be smooth and soft and readily spreadable even at comparatively low temperatures.

*Example II*

To illustrate the modified procedure of my invention, 1000 pounds of 40% cream was pasteurized, cooled, and held overnight as described in Example I, and then churned under the usual conditions to produce butter granules of about pea size. The buttermilk was drained from the churn without washing. Instead of chilling the butter granules at this stage, the butter was salted by the addition of 7 pounds of salt to the butter granules. This amount of salt was estimated to be sufficient to result in the incorporation of 1½ salt in the estimated yield of finished butter of 492 pounds. The butter was then worked to incorporate the salt into the mass and until it was essentially dry as evidenced by visual examination. At this time, 1000 pounds of sodium chloride brine containing 22% sodium chloride which had previously been chilled to minus 5° F. was introduced into the churn. The butter in the churn was at a temperature of 56° F. before adding the brine. The butter was worked in the brine by revolving the churn for about 10 minutes at which time the brine was drained from the churn and the butter temperature had been reduced to about 32° F. The butter was then worked to dryness in the usual manner. The resulting butter product was found to have a soft consistency and a waxy texture which permitted it to be readily spread, even immediately after removal from the open shelves of a household refrigerator.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A method for improving the spreadability of conventionally churned butter prepared from normal cream as customarily used in buttermaking which comprises rapidly chilling the butter after formation of butter granules and separation of buttermilk to a temperature between about 25° and 45° F. by direct agitating contact with a refrigerated brine.

2. A method according to claim 1 further characterized in that the brine is a sodium chloride solution refrigerated to a temperature between about plus 15° F. and minus 6° F.

3. A method according to claim 1 further characterized in that the butter is agitated in contact with sodium chloride brine in an amount ranging from about one to four times the weight of the butter.

4. A method according to claim 1 further characterized in that the temperature of the butter is rapidly reduced by about 10° to 40° F.

5. A method according to claim 1 further characterized in that said butter is agitated in contact with refrigerated sodium chloride brine for from about 5 to 20 minutes.

6. A method according to claim 1 further characterized in that said brine contains from about 15% to 25% by weight of sodium chloride.

7. A method according to claim 1 further characterized in that said brine is recirculated and rerefrigerated.

8. A method according to claim 1 further characterized in that said butter is contacted with refrigerated brine after working.

9. A method of improving the spreadability of conventionally churned butter which comprises agitating normal cream as is customarily used in buttermaking by churning to produce butter, separating said butter from the buttermilk, directly contacting said butter with from about one to four times the weight of the butter of a sodium chloride brine containing from about 15% to 25% sodium chloride and agitating, said brine being refrigerated to a temperature between about plus 15° F. and minus 6° F., agitating said butter in direct contact with said refrigerated brine for from about 5 to 20 minutes to reduce the temperature of the butter by from about 10° to 40° F. to a temperature between about 25° and 45° F.

10. A method according to claim 9 further characterized in that said butter is contacted with the refrigerated brine solution after the butter has been initially worked to dryness.

11. A method according to claim 9 further characterized in that said brine solution is continuously recirculated and rerefrigerated during the course of the butter treatment.

References Cited in the file of this patent
UNITED STATES PATENTS
2,406,819    Farrall _____ Sept. 3, 1946
OTHER REFERENCES McDowall: The Buttermakers Manual," vol. I, New Zealand University Press, 1953, pp. 486, 487, 489, 669 and 670.

UNITED STATES PATENT OFFICE
CERTIFICATE OF CORRECTION

January 16, 1962

Patent No. 3,017,275

Samuel T. Coulter

It is hereby certified that error appears in the above numbered patent requiring correction and that the said Letters Patent should read as corrected below.

Column 2, line 47, for "wtih" read -- with --; column 3, line 20, for "1½" read -- 1½% --.

Signed and sealed this 8th day of May 1962.

(SEAL)
Attest:

ERNEST W. SWIDER
Attesting Officer

DAVID L. LADD
Commissioner of Patents